(12) United States Patent
Park et al.

(10) Patent No.: US 11,901,801 B2
(45) Date of Patent: Feb. 13, 2024

(54) APPARATUS AND METHOD FOR MEASURING LOAD CURRENT WITH HIGH RESOLUTION

(71) Applicant: Samsung Electronics Co., Ltd., Suwon-si (KR)

(72) Inventors: Min Sang Park, Yongin-si (KR); Kyungrae Kim, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 68 days.

(21) Appl. No.: 17/540,538

(22) Filed: Dec. 2, 2021

(65) Prior Publication Data

US 2022/0271659 A1 Aug. 25, 2022

(30) Foreign Application Priority Data

Feb. 25, 2021 (KR) .......................... 10-2021-0025966

(51) Int. Cl.
*H02M 3/158* (2006.01)
*H02M 1/00* (2006.01)

(52) U.S. Cl.
CPC ......... *H02M 1/0009* (2021.05); *H02M 3/158* (2013.01)

(58) Field of Classification Search
CPC ..... H02M 3/158; H02M 1/0009; H02M 3/156
See application file for complete search history.

(56) References Cited

U.S. PATENT DOCUMENTS

| | | | |
|---|---|---|---|
| 9,531,249 B2 | 12/2016 | Yoon et al. | |
| 10,128,737 B1 | 11/2018 | Chen et al. | |
| 10,205,388 B2 | 2/2019 | Choi et al. | |
| 2005/0237037 A1 | 10/2005 | Xing | |
| 2014/0167723 A1 | 6/2014 | Kuo et al. | |
| 2019/0149045 A1 | 5/2019 | Choi et al. | |
| 2019/0157975 A1* | 5/2019 | Vanin | H02M 3/158 |
| 2019/0199210 A1* | 6/2019 | Shao | H02M 1/08 |

* cited by examiner

*Primary Examiner* — Alex Torres-Rivera
(74) *Attorney, Agent, or Firm* — Harness, Dickey & Pierce, P.L.C.

(57) ABSTRACT

A method of measuring a load current provided to a load of a switching converter includes obtaining a first reference voltage defining a peak of an inductor current passing through an inductor of the switching converter, generating a pulse based on the first reference voltage and an on-time of at least one power switch of the switching converter, generating an output signal by filtering the pulse, and setting a second mode from a first mode when a value of the load current is less than a first threshold value based on the output signal. The generating of the pulse further includes generating the pulse having a width extended in proportion to the on-time in the second mode.

8 Claims, 17 Drawing Sheets

APPARATUS AND METHOD FOR MEASURING LOAD CURRENT WITH HIGH RESOLUTION

CROSS-REFERENCE TO RELATED APPLICATION

This application is based on and claims priority under 35 U. S. C. § 119 to Korean Patent Application No. 10-2021-0025966, filed on Feb. 25, 2021, in the Korean Intellectual Property Office, the disclosure of which is incorporated by reference herein in its entirety.

BACKGROUND

Inventive concepts relate to a switching converter, and more particularly, to an apparatus and a method for measuring a load current with high resolution.

Switching converters may be used for generating a supply voltage providing power to various electronic parts, that is, a load, due to high power efficiency and the load may operate by consuming the load current provided by the switching converter. Recently, switching converters may be required to generate information on power consumption of the load as well as to generate a stable supply voltage in spite of a change in load current. For example, information on the load current may be used for estimating the power consumption of the load and/or a battery level and/or preventing or reducing the likelihood of overheating, and may be particularly important to applications requiring high power efficiency such as a mobile application using a battery as a power source. The load current may change in a wide range in accordance with a state of the load. Therefore, accurately measuring the load current may be important.

SUMMARY

Inventive concepts relate to an apparatus and/or a method for exactly or more precisely measuring a load current in a wide change range.

According to some example embodiments of inventive concepts, there is provided an apparatus comprising time extension circuitry configured to generate an extension signal that is activated during a time proportional to an on-time of at least one power switch of the switching converter, logic circuitry configured to generate a first control signal based on the on-time in response to a mode signal indicating a first mode, and the logic circuitry configured to generate the first control signal based on the extension signal in response to the mode signal indicating a second mode, switch circuitry configured to receive a first reference voltage defining a peak of an inductor current passing through an inductor of the switching converter and to generate a pulse based on the first control signal, a filter configured to generate an output signal by filtering the pulse, and a first comparator configured to generate the mode signal based on a voltage of the output signal and a second reference voltage. The logic circuitry is configured to be in the second mode based on the mode signal in response to a value of the load current being less than a first threshold value.

According to some example embodiments of inventive concepts, there is provided an apparatus comprising an inductor connected to an output node at which the output voltage is generated and an output capacitor connected to the output node, at least one power switch configured to provide an inductor current to the inductor, peak current detector circuitry configured to generate a peak signal by detecting a peak of the inductor current, the peak based on a first reference voltage, switch driver circuitry configured to control the at least one power switch based on the peak signal, and a load current meter configured to generate a pulse based on the first reference voltage and an on-time of the at least one power switch and to generate an output signal representing a magnitude of a load current by filtering the pulse. The load current meter is configured to change from a first mode to a second mode based on the output signal in response to a value of the load current being less than a first threshold value and to extend a width of the pulse in the second mode.

According to some example embodiments of inventive concepts, there is provided a method comprising obtaining a first reference voltage defining a peak of an inductor current passing through an inductor of the switching converter, generating a pulse based on the first reference voltage and an on-time of at least one power switch of the switching converter, generating an output signal by filtering the pulse, and changing from a first mode to a second mode based on the output signal in response to a value of the load current being less than a first threshold value. The generating of the pulse further comprises generating the pulse in the second mode having a width extended in proportion to the on-time.

BRIEF DESCRIPTION OF THE DRAWINGS

Some example embodiments of inventive concepts will be more clearly understood from the following detailed description taken in conjunction with the accompanying drawings in which.

DETAILED DESCRIPTION OF SOME EXAMPLE EMBODIMENTS

Figure 1:
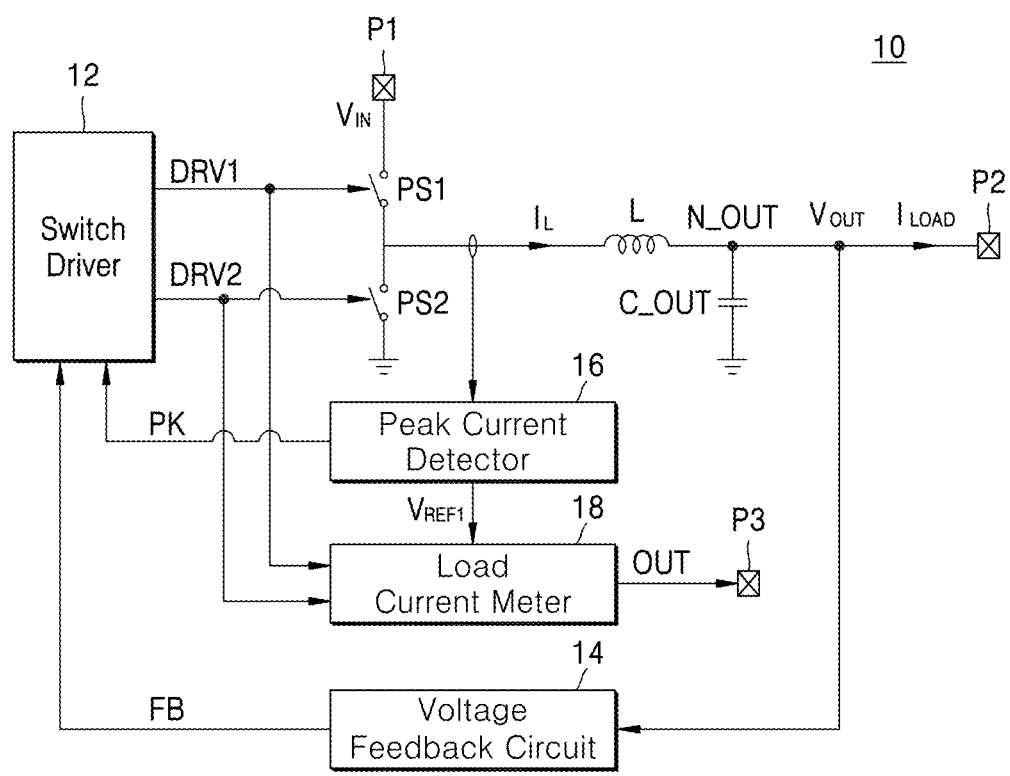
FIG. 1 is a block diagram illustrating a switching converter according to some example embodiments of inventive concepts.

FIG. 1 is a block diagram illustrating a switching converter 10 according to some example embodiments of inventive concepts. As illustrated in FIG. 1, the switching converter 10 may include an inductor L, an output capacitor C_OUT, a first power switch PS1, a second power switch PS2, a switch driver 12, a voltage feedback circuit 14, a peak current detector 16, and a load current meter 18. In some example embodiments, components of the switching converter 10 may be included in one semiconductor package. In some example embodiments, the switching converter 10 may include a printed circuit board (PCB) and at least two of the components of the switching converter 10 may be mounted on the PCB as separate semiconductor packages.

Referring to FIG. 1, the switching converter 10 may generate an output voltage $V_{OUT}$ at a second terminal P2 based on an input voltage $V_{IN}$ received through a first terminal P1. The output voltage $V_{OUT}$ may be used as a supply voltage of other electronic parts, for example, one or more loads, and the switching converter 10 may provide a load current $I_{LOAD}$ to the one or more loads through the second terminal P2. The switching converter 10 may refer to an arbitrary electronic circuit generating the output voltage $V_{OUT}$ by switching an element on/off and may be referred to as a switching regulator. For example, the first power switch PS1 and the second power switch PS2 of the switching converter 10 may be turned on or off based on a first drive signal DRV1 and a respective second drive signal DRV2 that are provided by the switch driver 12. In some example embodiments, the first power switch PS1 may be or may include a p-type field effect transistor (PFET) as a power transistor and may be turned on in response to the first drive signal DRV1 having a low level. In addition, in some example embodiments, the second power switch PS2 may be or may include an n-type field effect transistor (NFET) as a power transistor and may be turned on in response to the second drive signal DRV2 having a high level. In some example embodiments, the second power switch PS2 may be replaced by a diode having an anode to which a ground potential is applied and a cathode connected to the inductor L. Herein, it is assumed that the first drive signal DRV1 is an active-low signal and the second drive signal DRV2 is an active-high signal.

Herein, the state "on" of a switch (or a power switch) may refer to a state in which both ends of the switch are electrically connected and the state "off" of a switch may refer to a state in which both ends of the switch are electrically disconnected. In addition, two or more components electrically connected via a switch and/or a conducting wire in an "on" state may be simply referred to as being connected and two or more components always electrically connected via a conducting wire may be referred to as being coupled.

In some example embodiments, the input voltage $V_{IN}$ and the output voltage $V_{OUT}$ may be positive direct current (DC) voltages, and the switching converter 10 may be a DC-to-DC (DC-DC) converter. For example, the switching converter 10 may be a buck converter, may generate the output voltage $V_{OUT}$ less than the input voltage $V_{IN}$, and may be referred to as a step-down converter. Alternatively or additionally, the switching converter 10 may be a boost converter, may generate the output voltage $V_{OUT}$ higher than the input voltage $V_{IN}$, and may be referred to as a step-up converter. Alternatively or additionally, the switching converter 10 may be a buck-boost converter and may generate the output voltage $V_{OUT}$ lower or higher than the input voltage $V_{IN}$. Hereinafter, the switching converter 10 will be described mainly with reference to a buck converter. However, it will be understood that example embodiments of inventive concepts may be applied to an alternating current (AC)-to-DC (AC-DC) converter receiving an AC voltage as well as another kind of DC-DC converter.

Voltage feedback circuitry may include one or more voltage feedback circuits 14. The voltage feedback circuit 14 may compare the output voltage $V_{OUT}$ with a target voltage and may provide a feedback signal FB representing the comparison result to the switch driver 12. For example, the voltage feedback circuit 14 may compare the output voltage $V_{OUT}$ and/or a voltage divided from the output voltage $V_{OUT}$ with at least one reference voltage and may generate the feedback signal FB representing the comparison result. The switch driver 12 may identify a level of the output voltage $V_{OUT}$ based on the feedback signal FB. In some example embodiments, the voltage feedback circuit 14 may generate the feedback signal FB activated when the output voltage $V_{OUT}$ or the voltage divided from the output voltage $V_{OUT}$ is lower than the reference voltage and the switch driver 12 may activate the first drive signal DRV1 in response to the activated feedback signal FB.

Peak current detector circuitry may be or may include one or more peak current detectors 16. The peak current detector 16 may detect a peak of an inductor current $I_L$ passing through the inductor L, and may provide a peak signal PK to the switch driver 12. For example, the peak current detector 16 may sense the inductor current $I_L$ and may generate the activated peak signal PK when/in response to a magnitude of the sensed inductor current $I_L$ corresponds to a magnitude defined based on a first reference voltage $V_{REF1}$. The switch driver 12 may deactivate the first drive signal DRV1 in response to the activated peak signal PK and the inductor current $I_L$ may be reduced. As a result, the peak of the inductor current $I_L$ may be limited to the magnitude defined based on the first reference voltage $V_{REF1}$ and requirements of or expectations of the switching converter 10, for example, electromagnetic interference (EMI) requirements or expectations, may be partially or wholly satisfied. In some example embodiments, the first reference voltage $V_{REF1}$ may be changed by, for example, the switch driver 12 so that the peak of the inductor current $I_L$ may be controlled. In some example embodiments, unlike in FIG. 1, the peak current detector 16 may sense a current passing through the first power switch PS1 instead of or in addition to the inductor current $I_L$ and may detect a peak of the current passing through the first power switch PS1. An example of the peak current detector 16 will be described later with reference to FIG. 2.

The load current meter 18 may measure the load current $I_{LOAD}$ provided by the switching converter 10 through the second terminal P2 to the load. As illustrated in FIG. 1, the load current meter 18 may receive the first reference voltage $V_{REF1}$ from the peak current detector 16, may receive the first drive signal DRV1 and the second drive signal DRV2 from the switch driver 12, and may generate an output signal OUT representing a magnitude of the load current $I_{LOAD}$. The load current $I_{LOAD}$ may include the inductor current $I_L$ passing through the inductor L and/or a current generated by the discharging of the output capacitor C_OUT. Because the output capacitor C_OUT is charged by the inductor current $I_L$, the inductor current $I_L$ accumulated for a certain time may be the same as or nearly the same as the load current $I_{LOAD}$ accumulated for the same time. Therefore, the load current meter 18 may measure the load current $I_{LOAD}$ based on the first reference voltage $V_{REF1}$ including information on the peak of the inductor current $I_L$ and the first drive signal DRV1 and the second drive signal DRV2 including information on timing at which the inductor current $I_L$ is generated. Herein, the load current meter 18 may be referred to as an apparatus for measuring the load current $I_{LOAD}$. In some example embodiments, the load current meter 18 may receive only the first drive signal DRV1.

In some example embodiments, the output signal OUT generated by the load current meter 18 may be used for estimating the power consumption of the load. For example, as illustrated in FIG. 1, the output signal OUT may be output through a third terminal P3, and the load consuming the load current $I_{LOAD}$ and/or a power estimator included in another component may identify the magnitude of the load current $I_{LOAD}$ based on the output signal OUT. The power estimator may estimate the power consumption of the load based on the identified magnitude of the load current $I_{LOAD}$. The estimated power consumption may be used for a plurality of useful functions such as at least one of estimating a battery level, preventing or reducing the likelihood of the load from being overheated, and detecting an abnormal event. Herein, it is assumed that the output signal OUT is provided to the power estimator.

In some example embodiments, the load current $I_{LOAD}$ may change or swing within a wide range. For example, the load may be set to be in a power saving mode in order to reduce the power consumption and the load current $I_{LOAD}$ may have a remarkably reduced magnitude in the power saving mode as compared with magnitude in a normal mode. As described later with reference to the drawings, the output signal OUT may exactly or almost exactly represent the load current $I_{LOAD}$ in a wide change range so that the power consumption of the load may be almost exactly or exactly estimated. For example, the load current meter 18 may measure the low load current $I_{LOAD}$ with high resolution so that, although the power consumption of the load is low (for example, in the power saving mode), the power consumption of the load may be more precisely, e.g. exactly estimated. Examples of the load current meter 18 will be described later with reference to FIG. 3 or the like.

Switch driver circuitry may be or may include one or more switch drivers 12. The switch driver 12 may generate both the first drive signal DRV1 and the second drive signal DRV2 so that the output voltage $V_{OUT}$ is maintained to be close to the target voltage. As illustrated in FIG. 1, the switch driver 12 may receive the feedback signal FB from the voltage feedback circuit 14, may receive the peak signal PK from the peak current detector 16, and may generate either or both of the first drive signal DRV1 and the second drive signal DRV2 based on the peak signal PK and/or the feedback signal FB. In some example embodiments, the switch driver 12 may include a plurality of logic gates and may generate the first drive signal DRV1 and the second drive signal DRV2 by performing a logic operation on either or both the peak signal PK and the feedback signal FB. For example, the switch driver 12 may generate the deactivated first drive signal DRV1 and the activated second drive signal DRV2 in response to the activated peak signal PK so that the inductor current $I_L$ may be reduced. Alternatively or additionally, the switch driver 12 may generate the activated first drive signal DRV1 and the deactivated second drive signal DRV2 in response to the activated feedback signal FB so that the inductor current $I_L$ may increase. An example of the operation of the switch driver 12 will be described later with reference to FIG. 4.

Figure 2:
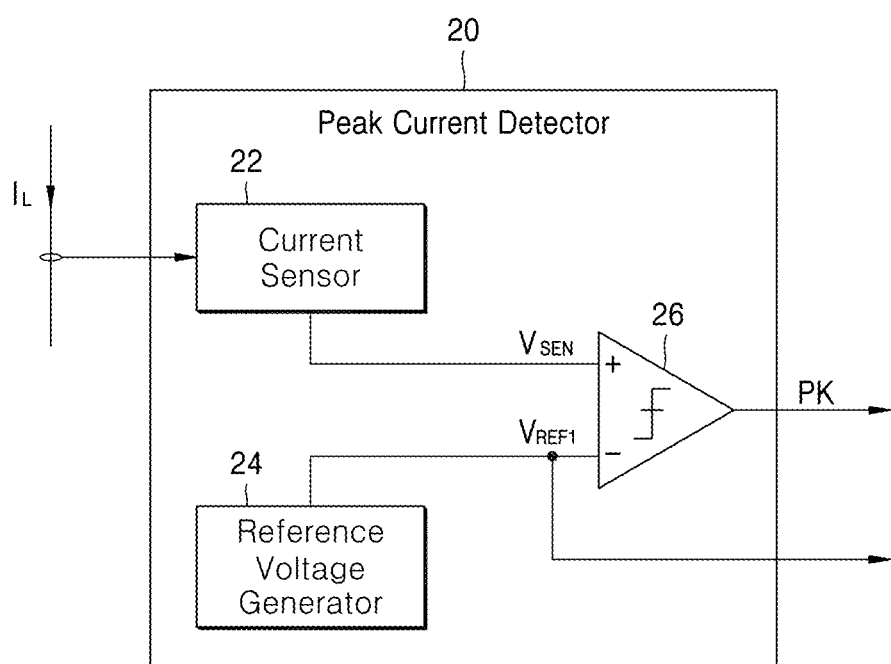
FIG. 2 is a block diagram illustrating a peak current detector according to some example embodiments of inventive concepts.

FIG. 2 is a block diagram illustrating a peak current detector 20 according to some example embodiments of inventive concepts. As described above with reference to FIG. 1, the peak current detector 20 may detect the peak of the inductor current $I_L$ and may generate the peak signal PK. As illustrated in FIG. 2, the peak current detector 20 may include a current sensor 22, a reference voltage generator 24, and a comparator 26.

The current sensor 22 may generate a sense voltage $V_{SEN}$ by sensing the inductor current $I_L$, and may provide the sense voltage $V_{SEN}$ to the comparator 26. For example, the current sensor 22 may generate the sense voltage $V_{SEN}$ proportional to the inductor current $I_L$. In some example embodiments, as described above with reference to FIG. 1, the current sensor 22 may sense the current passing through the first power switch PS1 of FIG. 1 instead of or in addition to the inductor current $I_L$.

The reference voltage generator 24 may generate the first reference voltage $V_{REF1}$ and may provide the first reference voltage $V_{REF1}$ to the comparator 26. The reference voltage generator 24 may include an arbitrary structure in which the first reference voltage $V_{REF1}$ is generated. For example, the reference voltage generator 24 may include a resistor and a current source generating a reference current, and the first reference voltage $V_{REF1}$ may correspond to a voltage generated by the reference current passing through the resistor. In some example embodiments, the reference voltage generator 24 may receive a control signal from the outside and may generate the first reference voltage $V_{REF1}$ varying based on the control signal.

The comparator 26 may generate the peak signal PK by comparing the sense voltage $V_{SEN}$ with the first reference voltage $V_{REF1}$. For example, as illustrated in FIG. 2, the comparator 26 may receive the sense voltage $V_{SEN}$ from the current sensor 22 through a non-inverting input and may receive the first reference voltage $V_{REF1}$ from the reference voltage generator 24 through an inverting input. Therefore, the comparator 26 may generate the activated peak signal PK when or in response to the sense voltage $V_{SEN}$ is higher than the first reference voltage $V_{REF1}$. Herein, it is assumed that the peak signal PK is an active-high signal so that the activated peak signal PK may have a high level.

As illustrated in FIG. 2, the peak current detector 20 may output the first reference voltage $V_{REF1}$ compared with the sense voltage $V_{SEN}$ by the comparator 26, and the first reference voltage $V_{REF1}$ may be provided to the load current meter 18 of FIG. 1. Unlike as in FIG. 2, when the peak current detector 20 outputs a voltage converted from the first reference voltage $V_{REF1}$, for example, a voltage divided by two or more resistors from the first reference voltage $V_{REF1}$, the voltage provided to the load current meter 18 of FIG. 1 may include an error caused by variation between the two or more resistors, e.g. a variation in resistance between the two or more resistors, so that an error may be caused in the load current meter 18 measuring the load current $I_{LOAD}$. However, as illustrated in FIG. 2, the first reference voltage $V_{REF1}$ may be provided to the load current meter 18 so that the load current meter 18 may exactly or more precisely measure the load current $I_{LOAD}$.

Figure 3:
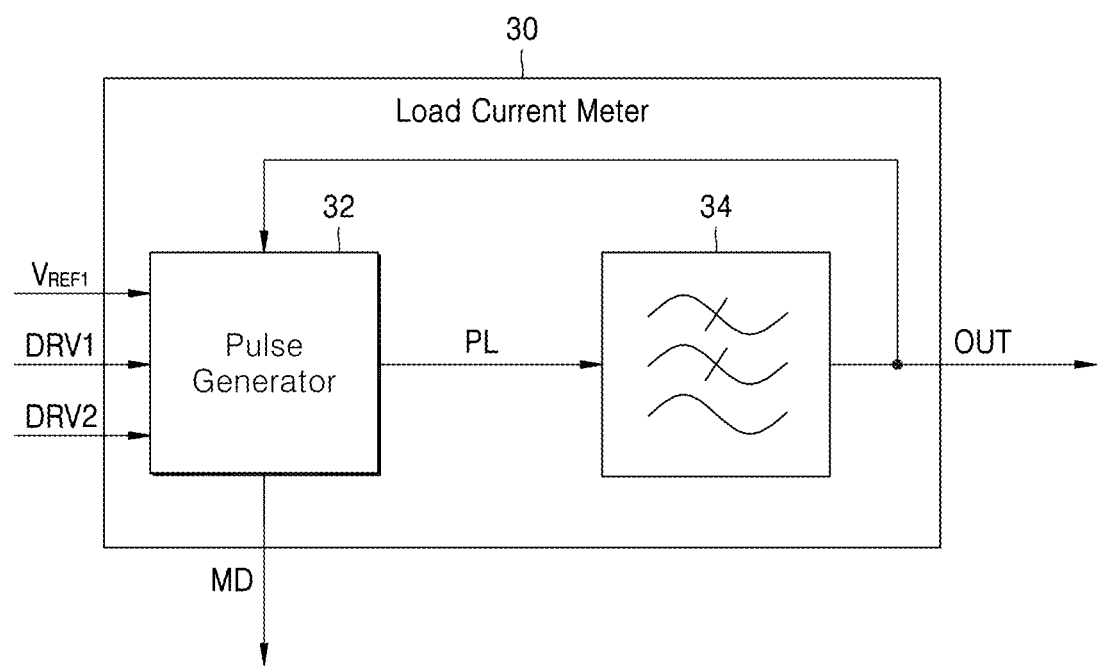
FIG. 3 is a block diagram illustrating a load current meter according to some example embodiments of inventive concepts.

FIG. 3 is a block diagram illustrating a load current meter 30 according to some example embodiments of inventive concepts. As described above with reference to FIG. 1, the load current meter 30 may receive the first reference voltage $V_{REF1}$, the first drive signal DRV1, and the second drive signal DRV2 and may generate the output signal OUT representing the magnitude of the load current $I_{LOAD}$. As illustrated in FIG. 3, the load current meter 30 may include a pulse generator 32 and a filter 34. Hereinafter, FIG. 3 will be described with reference to FIG. 1.

The pulse generator 32 may generate a pulse (or a pulse signal) PL based on the first reference voltage $V_{REF1}$, the first drive signal DRV1, and the second drive signal DRV2. In some example embodiments, the pulse generator 32 may generate the pulse PL having an amplitude, or an absolute value of amplitude, based on the first reference voltage $V_{REF1}$ and a width (or an activation width) based on the first drive signal DRV1 and the second drive signal DRV2. As described above with reference to FIG. 1, the first reference voltage $V_{REF1}$ may include the information on the peak of the inductor current $I_L$ and either or both of the first drive signal DRV1 and the second drive signal DRV2 may include the information on the timing at which the inductor current $I_L$ is generated. Therefore, the pulse PL may include information on the inductor current $I_L$ accumulated for a certain time and the filter 34 may generate the output signal OUT representing the magnitude of the load current $I_{LOAD}$ by filtering the pulse PL. Herein, the pulse PL is assumed as an active-high signal, that is, at a high level when the pulse PL is activated, and a width of the pulse PL may refer to a time for which the high level is maintained.

Referring to FIG. 3, the pulse generator 32 may receive the output signal OUT and may generate a mode signal MD. In some example embodiments, the pulse generator 32 may be set to be in one of a plurality of measurement modes. For example, the pulse generator 32 may identify the magnitude of the load current $I_{LOAD}$ based on the output signal OUT. The pulse generator 32 may be set, based on the identified magnitude of the load current $I_{LOAD}$, to be in a first mode in the high load current $I_{LOAD}$, and may be set in a second mode in the low load current $I_{LOAD}$. The pulse generator 32 may extend the width (e.g. a pulse width) of the pulse PL in order to measure the load current $I_{LOAD}$ in the second mode with resolution higher than that in the first mode. Therefore, in the second mode, the filter 34 may filter the pulse PL having an extended width and the output signal OUT may represent the amplified magnitude of the load current $I_{LOAD}$. Herein, the second mode may be referred to as an extension mode.

The pulse generator 32 may generate the mode signal MD representing the set measurement mode and the mode signal MD may be provided and/or output to the outside of the switching converter (for example, 10 of FIG. 1) including the load current meter 30. As described above, because the output signal OUT may represent the amplified magnitude of the load current $I_{LOAD}$ in the second mode, in order to inform the power estimator receiving the output signal OUT of the measurement mode in which the output signal OUT is generated, the load current meter 30 may output the mode signal MD. In some example embodiments, the power estimator may identify the measurement mode of the load current meter 30 based on the mode signal MD, and may process the output signal OUT based on the identified measurement mode. For example, when the second mode is identified based on the mode signal MD, the power estimator may compensate for a value corresponding to the output signal OUT based on a ratio in which the width of the pulse PL is extended. Herein, it is assumed that the mode signal MD is at a low level in the first mode and is at a high level in the second mode. Examples of the pulse generator 32 will be described later with reference to FIG. 5.

The filter 34 may generate the output signal OUT by filtering the pulse PL. For example, as described above, an amplitude of the pulse PL may be based on the peak of the inductor current $I_L$, and may have a width based on timing at which the inductor current $I_L$ is provided. The filter 34 may generate the output signal OUT by filtering the pulse PL as a low pass filter as illustrated in FIG. 3. Therefore, the output signal OUT may have a physical quantity (for example, a voltage) proportional to the load current $I_{LOAD}$. The filter 34 may have an arbitrary structure for filtering the pulse PL and an example of the filter 34 will be described later with reference to FIG. 7.

Figure 4:
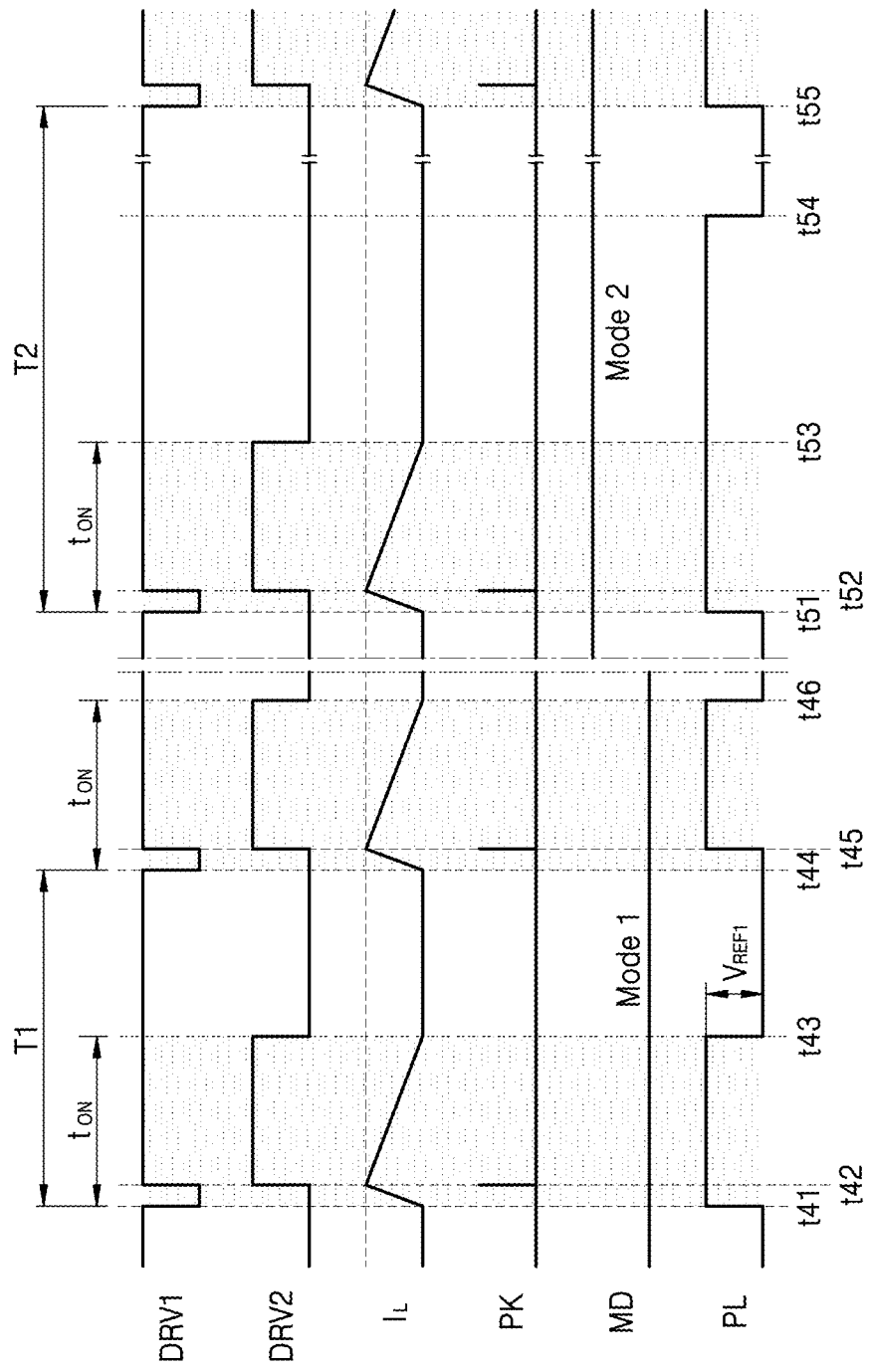
FIG. 4 is a timing diagram illustrating an example of an operation of a switching converter according to some example embodiments of inventive concepts.

FIG. 4 is a timing diagram illustrating an example of an operation of a switching converter 10 according to some example embodiments of inventive concepts. Specifically, FIG. 4 illustrates signals in the switching converter 10 of FIG. 1 and the mode signal MD and the pulse PL in the load current meter 30 of FIG. 3 over time. Hereinafter, FIG. 4 will be described with reference to FIG. 1 and it is assumed that the load current meter 18 of FIG. 1 generates the mode signal MD and the pulse PL of FIG. 3. In addition, in an example of FIG. 4, it is assumed that the load current meter 18 is set to be in the first mode in a period including time t41 to time t46 and in the second mode in a period including time t51 to time t55.

Referring to FIG. 4, at the time t41, the first drive signal DRV1 may activate/be activated. For example, the switch driver 12 may generate the activated first drive signal DRV1 in response to the activated feedback signal FB. Therefore, the first power switch PS1 may be turned on, a current may be supplied from the first terminal P1 to which the input voltage $V_{IN}$ is applied, and the inductor current $I_L$ may increase as illustrated in FIG. 4. The load current meter 18 may activate the pulse PL in response to the activated first drive signal DRV1 and the pulse PL may have an amplitude the same as that of the first reference voltage $V_{REF1}$ and/or an amplitude defined by the first reference voltage $V_{REF1}$.

At the time t42, the peak signal PK may active/be activated. For example, the inductor current $I_L$ may reach the peak defined by the first reference voltage $V_{REF1}$ as illustrated in FIG. 4 by a dashed line so that the peak current detector 16 may generate the activated peak signal PK. The switch driver 12 may generate the deactivated first drive signal DRV1 and the activated second drive signal DRV2 in response to the activated peak signal PK. Therefore, the first power switch PS1 may be turned off, the second power switch PS2 may be turned on, a current may be supplied from a ground node, and the inductor current $I_L$ may be gradually reduced as illustrated in FIG. 4.

At the time t43, the inductor current $I_L$ may be zero or approximately zero. In some example embodiments, the peak current detector 16 may include a current sensor (for example, 22 of FIG. 2) and/or a zero current detector. The switch driver 12 may identify an event in which the inductor current $I_L$ becomes zero from the peak current detector 16 and may generate the deactivated second drive signal DRV2. Therefore, the second power switch PS2 may be turned off and the load current $I_{LOAD}$ may be provided by the output capacitor C_OUT. The load current meter 18 may deactivate the pulse PL in response to the deactivated second drive signal DRV2 so that the pulse PL may have a width corresponding to a period between the time t41 and the time t43. In some example embodiments, the load current meter 18 may not receive the second drive signal DRV2, may identify the event in which the inductor current $I_L$ becomes zero from the peak current detector 16, and may deactivate the pulse PL.

As illustrated in FIG. 4, between the time t41 and the time t43, the first drive signal DRV1 and/or the second drive signal DRV2 may be activated, the first power switch PS1 and/or the second power switch PS2 may be turned on, the inductor current $I_L$ may be positive, and the pulse PL may be activated. Herein, the period between the time t41 and the time t43, for example, the period in which at least one power switch of the switching converter 10, e.g., the first power switch PS1 and/or the second power switch PS2 are/is maintained to be in an on state, may be referred to as on-time $t_{ON}$. Therefore, in the first mode, the pulse PL may be activated during the on-time $t_{ON}$ and the width of the pulse PL may be the same as the on-time $t_{ON}$.

At the time t44, the first drive signal DRV1 may be activated again. For example, the output voltage $V_{OUT}$ may be reduced due to discharging of the output capacitor C_OUT from the time t43 so that the feedback signal FB may be activated. The switch driver 12 may activate the first drive signal DRV1 in response to the activated feedback signal FB so that the inductor current $I_L$ may increase again. Like at the time t42 and the time t43, the peak signal PK may be activated at the time t45 and the second drive signal DRV2 and the pulse PL may be deactivated at the time t46. As illustrated in FIG. 4, a period between the time t44 and the time t46 as on-time $t_{ON}$ may be the same as the period between the time t41 and the time t43 and a period between the time t51 and the time t53, which is described later.

As illustrated in FIG. 4, in the duration between the time t41 to the time t46, a switching period of the switching converter 10 may correspond to a first period T1 and the pulse PL may also have the first period T1. Due to the high load current $I_{LOAD}$, the first period T1 may be shorter than a second period T2 described later and, due to substantially uniform on-time $t_{ON}$, the output signal OUT may have a large physical quantity.

At the time t51, the first drive signal DRV1 may activate/be activated. For example, the output voltage $V_{OUT}$ may be reduced due to the discharging of the output capacitor C_OUT so that the feedback signal FB may active/be activated. The switch driver 12 may activate the first drive signal DRV1 in response to the activated feedback signal FB so that the inductor current $I_L$ may increase. Like at the time t42 and the time t45, at the time t52, the peak signal PK may be activated, the first drive signal DRV1 may be deactivated, and the second drive signal DRV2 may be activated.

At the time t53, the inductor current $I_L$ may be approximately zero and the second drive signal DRV2 may deactivate/be deactivated. In the second mode, the load current meter 18 may increase and/or extend the width of the pulse PL and may deactivate the pulse PL at the time t54, instead of deactivating the pulse PL in response to the deactivated second drive signal DRV2. At the time t55, the first drive signal DRV1 may be activated again and, due to the low load current $I_{LOAD}$, a duration between the time t51 and the time t55, e.g., the second period T2, may be longer than the first period T1. Unlike in FIG. 4, when the pulse PL has a width of on-time $t_{ON}$ like in the first mode in a state in which the load current $I_{LOAD}$ is low, the output signal OUT may correspond to a very low value due to the second period T2 so that it may not be easy or may be more difficult to exactly detect the magnitude of the load current $I_{LOAD}$. Alternatively or additionally, when the physical quantity of the output signal OUT is amplified in the state in which the load current $I_{LOAD}$ is low, due to noise and an input offset of an amplifier, the load current $I_{LOAD}$ may not be exactly measured or may be measured with a larger error.

As described later with reference to the accompanying drawings, the load current meter 18 may increase/extend the width of the pulse PL in proportion to on-time $t_{ON}$ in the second mode so that the output signal OUT generated by filtering the pulse PL may correspond to a proper physical quantity and the magnitude of the load current $I_{LOAD}$, which is detected based on the output signal OUT in the second mode, may be compensated for based on the ratio in which the width of the pulse PL is increased or extended. Therefore, the load current meter 18 may measure the low load current $I_{LOAD}$ with high or higher resolution.

Figure 5:
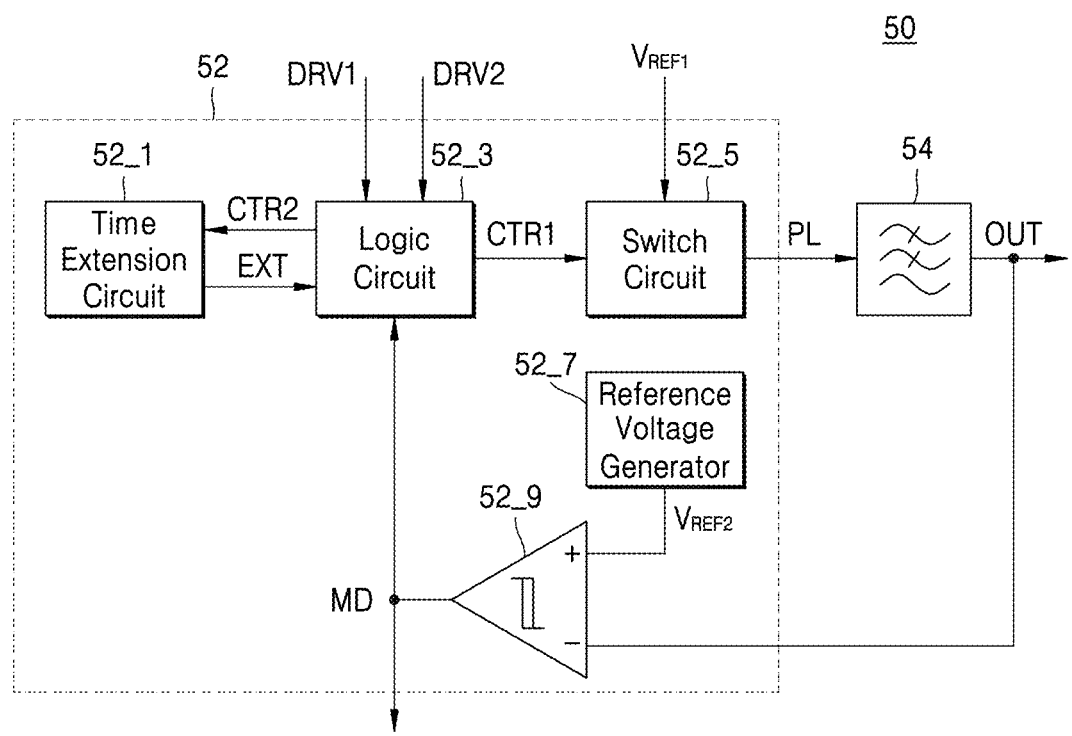
FIG. 5 is a block diagram illustrating a load current meter according to some example embodiments of inventive concepts.

FIG. 5 is a block diagram illustrating a load current meter 50 according to some example embodiments of inventive concepts. As described above with reference to FIGS. 1 and 3, the load current meter 50 may receive the first reference voltage $V_{REF1}$, the first drive signal DRV1, and the second drive signal DRV2 and may generate the output signal OUT and the mode signal MD. As illustrated in FIG. 5, the load current meter 50 may include a pulse generator 52 and a filter 54 and the pulse generator 52 may include a time extension circuit 52_1, a logic circuit 52_3, a switch circuit 52_5, a reference voltage generator 52_7, and a comparator 52_9.

Switch circuitry may be or may include one or more switch circuits 52_5. The switch circuit 52_5 may receive the first reference voltage $V_{REF1}$ and a first control signal CTR1 and may generate the pulse PL. For example, the switch circuit 52_5 may include at least one switch controlled by the first control signal CTR1 and the at least one switch may generate the pulse PL by providing the first reference voltage $V_{REF1}$ and/or the ground potential to the filter 54. An example of the switch circuit 52_5 will be described later with reference to FIG. 7.

The reference voltage generator 52_7 may generate a second reference voltage $V_{REF2}$ and may provide the second reference voltage $V_{REF2}$ to the comparator 52_9. The comparator 52_9 may generate the mode signal MD by comparing the second reference voltage $V_{REF2}$ with the output signal OUT. For example, as illustrated in FIG. 5, the comparator 52_9 may receive the second reference voltage $V_{REF2}$ from the reference voltage generator 52_7 through a non-inverting input and may receive the output signal OUT from the filter 54 through an inverting input. Therefore, the mode signal MD may be deactivated when the voltage of the output signal OUT is greater than the second reference voltage $V_{REF2}$, e.g., in the first mode and may be activated when the voltage of the output signal OUT is less than the second reference voltage $V_{REF2}$, e.g., in the second mode. As illustrated in FIG. 5, the mode signal MD may be provided to the logic circuit 52_3 and may be output to the outside of the pulse generator 52. In some example embodiments, as described later with reference to FIG. 6, the comparator 52_9 and/or the reference voltage generator 52_7 may provide hysteresis for mode switching. Herein, the comparator 52_9 may be referred to as a first comparator.

Logic circuitry may be or may include one or more logic circuits 52_3. The logic circuit 52_3 may receive the first drive signal DRV1, the second drive signal DRV2, the mode signal MD, and an extension signal EXT and may generate the first control signal CTR1 and a second control signal CTR2. In some example embodiments, the logic circuit 52_3 may include a plurality of logic gates and may generate the first control signal CTR1 and the second control signal CTR2 based on the first drive signal DRV1, the second drive signal DRV2, the mode signal MD, and the extension signal EXT.

The logic circuit 52_3 may identify a measurement mode based on the mode signal MD and may identify on-time $t_{ON}$ based on the first drive signal DRV1 and the second drive signal DRV2. When the first mode is identified based on the mode signal MD, the logic circuit 52_3 may generate the first control signal CTR1 so that the pulse PL having a width corresponding to the on-time $t_{ON}$ may be generated by the switch circuit 52_5. In addition, when the second mode is identified based on the mode signal MD, the logic circuit 52_3 may generate the second control signal CTR2 so that the time extension circuit 52_1 generates the extension signal EXT and may generate the first control signal CTR1 based on the extension signal EXT so that the pulse PL having a width extended in proportion to the on-time $t_{ON}$ is generated by the switch circuit 52_5.

Time extension circuitry may be or may include one or more time extension circuits 52_1. The time extension circuit 52_1 may receive the second control signal CTR2 from the logic circuit 52_3 and may generate the extension signal EXT activated for a time that is proportional to the on-time $t_{ON}$ based on the second control signal CTR2. The extension signal EXT may be provided to the logic circuit 52_3 and, as described above, may be used for generating the pulse PL having the extended width in the second mode. In some example embodiments, the extension signal EXT may be activated (or deactivated) for the time exactly or nearly exactly proportional to the on-time $t_{ON}$. An example of the time extension circuit 52_1 will be described later with reference to FIG. 8.

Figure 6:
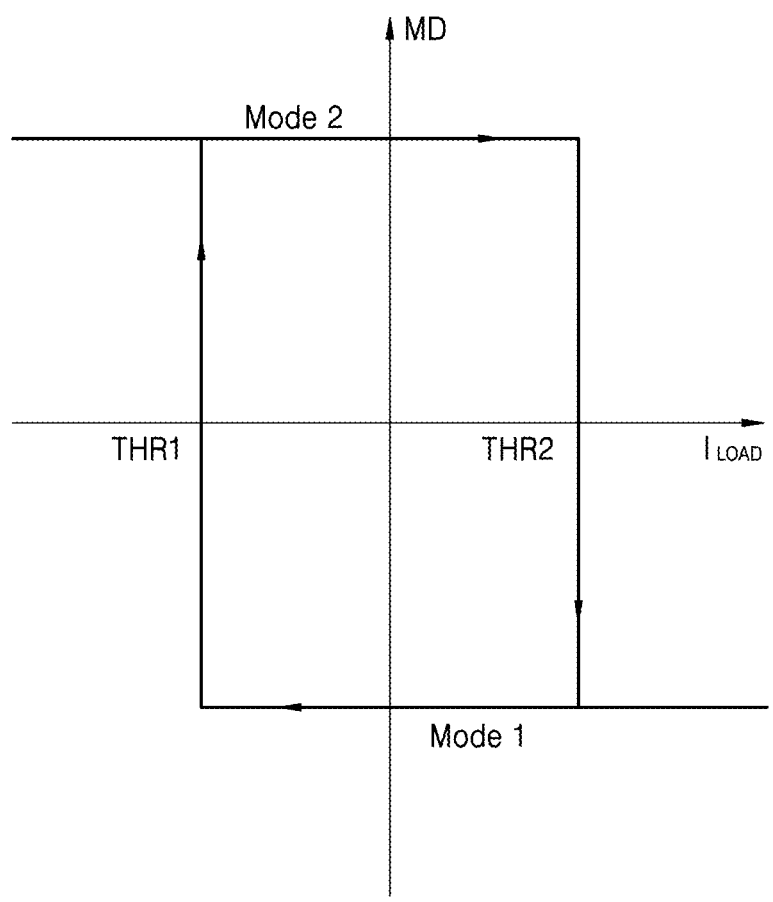
FIG. 6 is a graph illustrating switch of a measurement mode of a load current meter according to some example embodiments of inventive concepts.

FIG. 6 is a graph illustrating switch of a measurement mode of a load current meter according to some example embodiments of inventive concepts. Specifically, the graph of FIG. 6 illustrates a hysteresis loop generated when the measurement mode of the load current meter is switched. In some example embodiments, the hysteresis loop of FIG. 6 may be provided by the reference voltage generator 52_7 and/or the comparator 52_9 of FIG. 5, which will be described hereinafter with reference to FIG. 5.

As described above with reference to the drawings, the load current meter 50 may be set to the first mode when the load current $I_{LOAD}$ is high, and may be set to the second mode when the load current $I_{LOAD}$ is low. In order to prevent or reduce the likelihood of an error and/or an inaccuracy from occurring due to frequent switch of the measurement mode, the reference voltage generator 52_7 and/or the comparator 52_9 may provide hysteresis to the switch of the measurement mode. For example, as illustrated in FIG. 6, the load current meter 50 may be set to the second mode when a value of the load current $I_{LOAD}$ is less than a first threshold value THR1 and to the first mode when a value of the load current $I_{LOAD}$ is greater than a second threshold value THR2. The second threshold value THR2 may be greater than the first threshold value THR1 (THR2>THR1).

The hysteresis loop of FIG. 6 may be implemented by an arbitrary method. In some example embodiments, as illustrated in FIG. 5, the comparator 52_9 may have hysteresis corresponding to a difference between the first threshold value THR1 and the second threshold value THR2 and the reference voltage generator 52_7 may provide the second reference voltage $V_{REF2}$ having a value corresponding to a median of the first threshold value THR1 and the second threshold value THR2 to the comparator 52_9. Alternatively or additionally, in some example embodiments, unlike in FIG. 5, the comparator 52_9 may not have hysteresis and the reference voltage generator 52_7 may receive the mode signal MD output by the comparator 52_9. The reference voltage generator 52_7 may set the second reference voltage $V_{REF2}$ to be at a first level corresponding to the first threshold value THR1 in the first mode and to be at a second level corresponding to the second threshold value THR2 in the second mode based on the mode signal MD.

Figure 7:
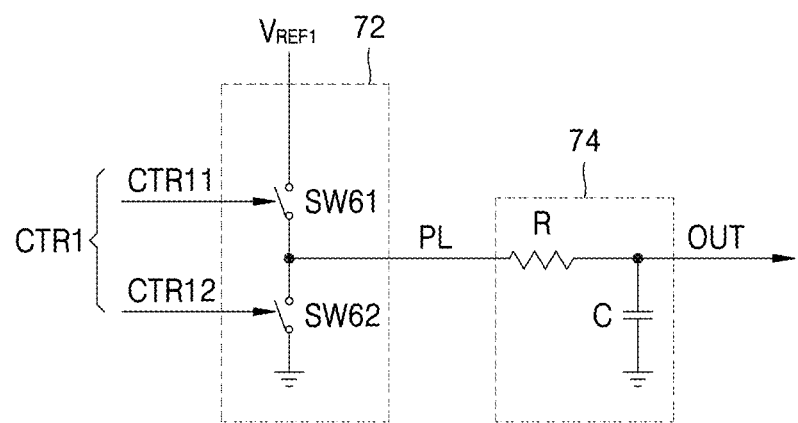
FIG. 7 is a circuit diagram illustrating a switch circuit and a filter according to some example embodiments of inventive concepts.

FIG. 7 is a circuit diagram illustrating a switch circuit 72 and a filter 74 according to some example embodiments of inventive concepts. As illustrated in FIG. 7, the first control signal CTR1 may include two control signals CTR11 and CTR12 and the output signal OUT may have the voltage as the physical quantity corresponding to the load current $I_{LOAD}$.

Referring to FIG. 7, the switch circuit 72 may receive the first reference voltage $V_{REF1}$ and the first control signal CTR1, and may generate the pulse PL. A first switch SW61 may provide the first reference voltage $V_{REF1}$ to the filter 74 in response to the activated control signal CTR11 and may block the first reference voltage $V_{REF1}$ from the filter 74 in response to the deactivated control signal CTR11. In some example embodiments, the first switch SW61 may include a p-channel field effect transistor (PFET) and the control signal CTR11 may be an active-low signal; however, example embodiments are not limited thereto. In addition, a second switch SW62 may provide a ground potential to the filter 74 in response to the activated control signal CTR12 and may block the ground potential from the filter 74 in response to the deactivated control signal CTR12. In some example embodiments, the second switch SW62 may include an n-channel field effect transistor (NFET) and the control signal CTR12 may be an active-high signal; however, example embodiments are not limited thereto. Therefore, the switch circuit 72 may generate the pulse PL described above with reference to FIG. 4 based on the first control signal CTR1. In some example embodiments, the switch circuit 72 may further include a voltage buffer having high input impedance and low output impedance. The first switch SW61 may receive a voltage corresponding to the first reference voltage $V_{REF1}$ from the voltage buffer receiving the first reference voltage $V_{REF1}$ from the peak current detector (for example, 16 of FIG. 1).

The filter 74 may be or include a low pass filter and may include a resistor R and a capacitor C that may be connected in series. A cutoff frequency of the filter 74 may be defined based on a range of a period of the pulse PL, and the resistance of the resistor R and the capacitance of the capacitor C may be determined by the cutoff frequency. In some example embodiments, the filter 74 may have a higher order and may have a structure more complicated than the structure illustrated in FIG. 7.

Figure 8:
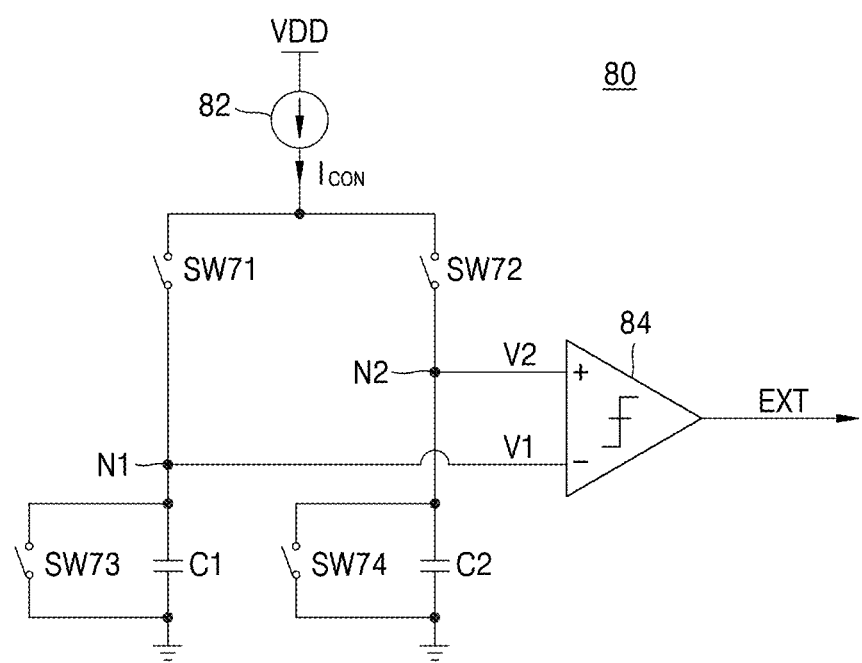
FIG. 8 is a circuit diagram illustrating a time extension circuit according to some example embodiments of inventive concepts.
Figure 9:
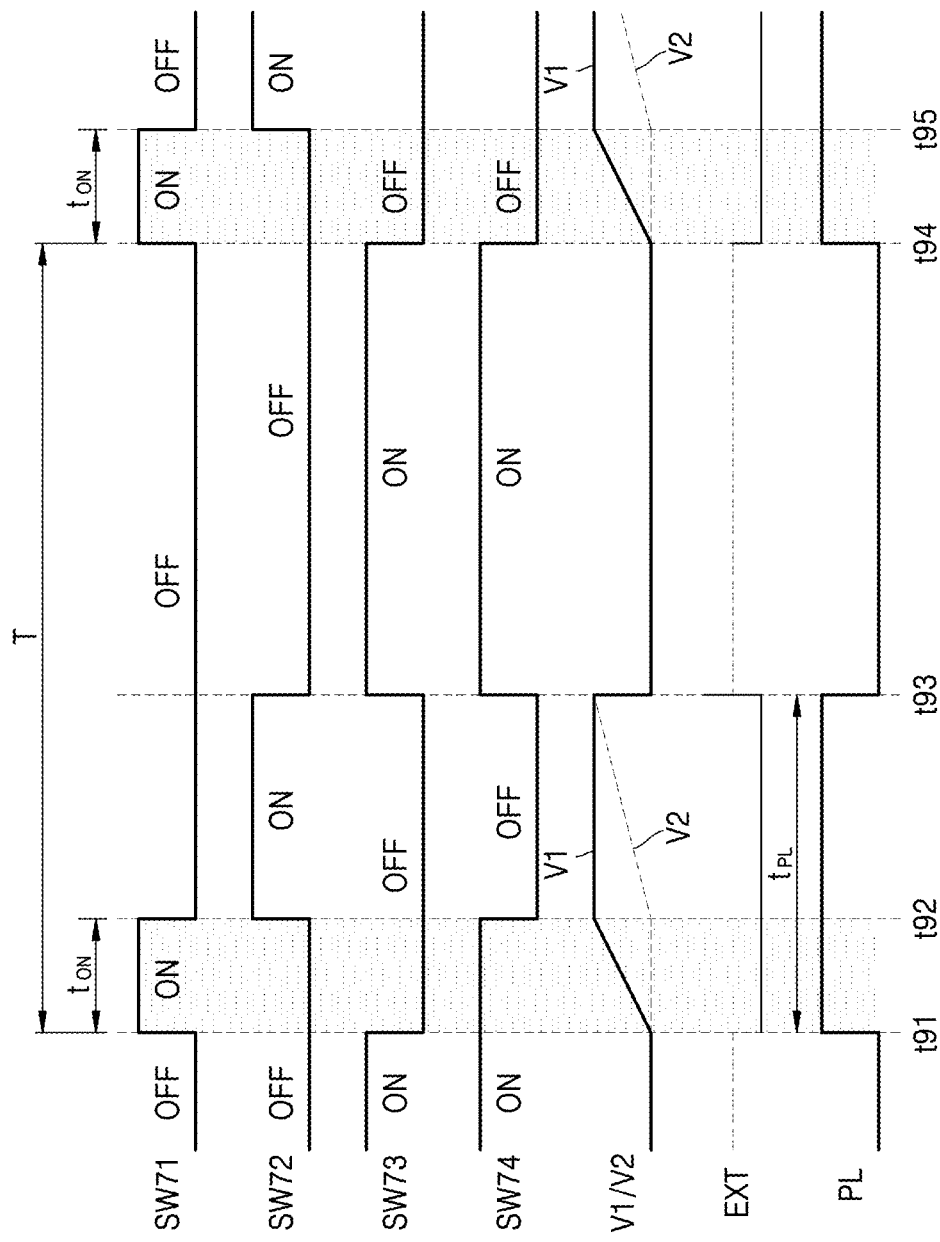
FIG. 9 is a timing diagram illustrating an example of an operation of a time extension circuit according to some example embodiments of inventive concepts.

FIG. 8 is a circuit diagram illustrating a time extension circuit 80 according to some example embodiments of inventive concepts and FIG. 9 is a timing diagram illustrating an example of an operation of the time extension circuit 80 according to some example embodiments of inventive concepts. As described above with reference to FIG. 5, the time extension circuit 80 of FIG. 8 may receive the second control signal CTR2 and may generate the extension signal EXT.

Referring to FIG. 8, the time extension circuit 80 may include a current source 82, a comparator 84, a first capacitor C1, a second capacitor C2, and first to fourth switches SW71 to SW74. The current source 82 may generate a constant current $I_{CON}$ from a positive supply voltage VDD. The current source 82 may have an arbitrary structure generating the constant current $I_{CON}$ and may include, for example, a current sink and a current mirror. The first switch SW71 may be connected between the current source 82 and the first capacitor C1, and the second switch SW72 may be connected between the current source 82 and the second capacitor C2. In addition, the third switch SW73 may be connected to the first capacitor C1 in parallel and the fourth switch SW74 may be connected to the second capacitor C2 in parallel. The second control signal CTR2 may include a plurality of control signals and may be turned on and/or off by each of the first to fourth switches SW71 to SW74. The plurality of switches SW71 to SW74 may be transistors such as NFET transistors and/or PFET transistors; however, example embodiments are not limited thereto.

The first capacitor C1 may be connected between a first node N1 and a ground node, and the second capacitor C2 may be connected between a second node N2 and the ground node. As described later, for a charge speed varying in accordance with the constant current $I_{CON}$, the second capacitor C2 may have capacitance greater than that of the first capacitor C1. In some example embodiments, the second capacitor C2 may have capacitance corresponding to an integer multiple of the capacitance of the first capacitor C1. For example, the second capacitor C2 may include a plurality of capacitors connected to one another in parallel and each of the plurality of capacitors is same as the first capacitor C1 and has the same capacitances as that of the first capacitor C1.

The comparator 84 may be connected to the first switch SW71, the third switch SW73, and the first capacitor C1 in the first node N1 and may be connected to the second switch SW72, the fourth switch SW74, and the second capacitor C2 in the second node N2. The comparator 84 may compare a voltage of the first node N1 with a voltage of the second node N2 and may generate the extension signal EXT representing the comparison result. Herein, the voltage of the first node N1 connected to the first capacitor C1, for example, a first voltage V1, may be referred to as a voltage of the first capacitor C1 and the voltage of the second node N2 connected to the second capacitor C2, that is, a second voltage V2, may be referred to as a voltage of the second capacitor C2. In addition, herein, the comparator 84 may be referred to as a second comparator.

Referring to FIG. 9, between time t91 and time t92, on-time $t_{ON}$ may occur. As illustrated in FIG. 9, before the time t91, for example, before the on-time $t_{ON}$, the first switch SW71 and the second switch SW72 may be turned off and the third switch SW73 and the fourth switch SW74 may be turned on. Therefore, the first capacitor C1 and the second capacitor C2 may be discharged and, as illustrated in FIG. 9, each of the first voltage V1 and the second voltage V2 may be approximately zero (or a ground potential).

At the time t91, the on-time $t_{ON}$ may start. As illustrated in FIG. 9, the first switch SW71 may be turned on and the third switch SW73 may be turned off. Therefore, the first capacitor C1 may be charged by the constant current $I_{CON}$ and the first voltage V1 may increase. In addition, the second switch SW72 may be maintained in an off state and the fourth switch SW74 may be maintained in an on state. Therefore, the second voltage V2 may be maintained as zero (a ground potential) and the comparator 84 may generate the deactivated extension signal EXT in response to the first voltage V1 higher than the second voltage V2.

At the time t92, the on-time $t_{ON}$ may be terminated. As illustrated in FIG. 9, the first switch SW71 may be turned off and the third switch SW73 may be maintained in an off state. Therefore, the charging of the first capacitor C1 may end, charges stored in the first capacitor C1 may be maintained due to the first node N1 floated electrically, and the first voltage V1 may be maintained constant. The first voltage V1 may depend on a time for which the first capacitor C1 is charged, for example, the on-time $t_{ON}$, so that a magnitude of the first voltage V1 may correspond to a length of the on-time $t_{ON}$. In addition, at the time t92, the second switch SW72 may be turned on and the fourth switch SW74 may be turned off. Therefore, the second capacitor C2 may be charged by the constant current $I_{CON}$ and the second voltage V2 may increase. As described above, the second capacitor C2 may have capacitance greater than that of the first capacitor C1 so that a speed at which the second voltage V2 increases between the time t92 and time t93 may be lower than a speed at which the first voltage V1 increases between the time t91 and the time t92.

At the time t93, the second voltage V2 may reach the first voltage V1. Therefore, the comparator 84 may generate the activated extension signal EXT and the logic circuit 52_3 of FIG. 5 may deactivate the pulse PL in response to the activated extension signal EXT. In addition, the first switch SW71 and the second switch SW72 may be turned off and the third switch SW73 and the fourth switch SW74 may be turned on. Therefore, the first capacitor C1 and the second capacitor C2 may be discharged and, as illustrated in FIG. 9, each of the first voltage V1 and the second voltage V2 may be approximately zero (or a ground potential). As described above, because the first voltage V1 may have a magnitude corresponding to the on-time $t_{ON}$ and the first capacitor C1 and the second capacitor C2 are charged by the same current, that is, the constant current $I_{CON}$, a period in which the second capacitor C2 is charged, that is, a period between the time t92 and the time t93, may be proportional to the on-time $t_{ON}$ based on a ratio between the capacitance of the first capacitor C1 and the capacitance of the second capacitor C2. For example, when the capacitance of the second capacitor C2 is twice the capacitance of the first capacitor C1, the period between the time t92 and the time t93 may be twice the on-time $t_{ON}$. Therefore, when the capacitance of the second capacitor C2 is N times the capacitance of the first capacitor C1 (N is a positive real number), a width $t_{PL}$ of the pulse PL may be defined in [EQUATION 1] as follows.

$$t_{PL}=(1+N)t_{ON} \qquad \text{[EQUATION 1]}$$

As a result, in the second mode, the pulse PL may have the width $t_{PL}$, extended in proportion to the on-time $t_{ON}$. In addition, because the first capacitor C1 and the second capacitor C2 share the current source 82 generating the constant current $I_{CON}$, a ratio between the on-time $t_{ON}$ and the width $t_{PL}$ of the pulse PL may depend only on the ratio between the capacitance of the first capacitor C1 and the capacitance of the second capacitor C2, that is, N of the [EQUATION 1] and errors caused by other variations may be removed.

At time t94, the on-time $t_{ON}$ may start again and the pulse PL may be activated again. Due to the increase in the first voltage V1, the extension signal EXT may be deactivated. In addition, at time t95, the on-time $t_{ON}$ may be terminated and the pulse PL may be maintained in an activated state in spite of the termination of the on-time $t_{ON}$.

When a switching period T is long, that is, in a state in which the load current $I_{LOAD}$ is low, unlike in FIG. 9, when the pulse PL has a width corresponding to the on-time $t_{ON}$, the voltage of the output signal OUT generated by filtering the pulse PL may have a small magnitude and, it may not be easy to exactly or accurately detect the magnitude of the load current $I_{LOAD}$ from the output signal OUT due to noise and an input offset of an amplifier. However, in the second mode, the time extension circuit 80 may generate the extension signal EXT activated in a period exactly or more accurately proportional to the on-time $t_{ON}$ from a point in time at which the on-time $t_{ON}$ is terminated and, the voltage of the output signal OUT may have a magnitude proper to detect the magnitude of the load current $I_{LOAD}$ due to the width of the pulse PL extended based on the extension signal EXT.

Figure 10:
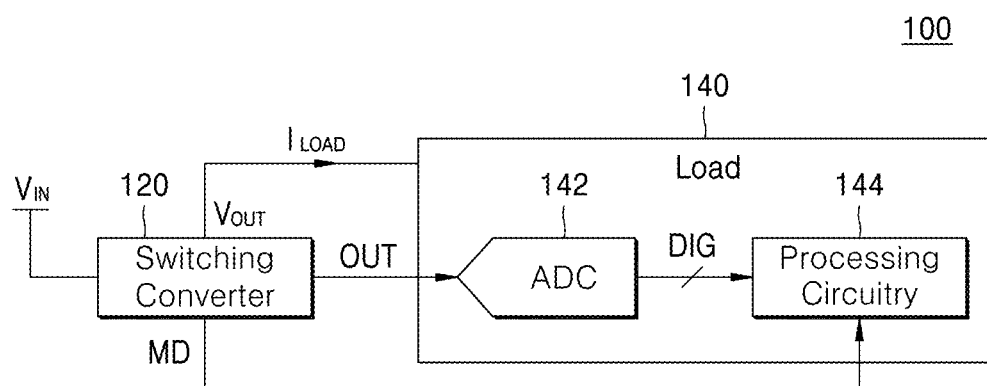
FIG. 10 is a block diagram illustrating a system according to some example embodiments of inventive concepts.

FIG. 10 is a block diagram illustrating a system 100 according to some example embodiments of inventive concepts. Specifically, the block diagram of FIG. 10 illustrates the system 100 including a switching converter 120 and a load 140 to which power is supplied by the switching converter 120.

Referring to FIG. 10, the switching converter 120 may generate the output voltage $V_{OUT}$ from the input voltage $V_{IN}$ and may provide the load current $I_{LOAD}$ to the load 140. In addition, as described above with reference to the drawings, the switching converter 120 may measure the load current $I_{LOAD}$ and may provide the output signal OUT representing the magnitude of the load current $I_{LOAD}$ and the mode signal MD representing the measurement mode of the load current $I_{LOAD}$ to the load 140.

The load 140 may be referred to as a load circuit and/or a load device, may receive the output voltage $V_{OUT}$ from the switching converter 120, and may consume the load current $I_{LOAD}$. As illustrated in FIG. 10, the load 140 may include an analog-to-digital converter (ADC) 142 and processing circuitry 144. In some example embodiments, the load 140 consuming the load current $I_{LOAD}$ may further include additional components providing various functions. In some example embodiments, in order to monitor power consumption of the load 140, the ADC 142 and the processing circuitry 144 may be outside the load 140 and may not consume at least a part of the load current $I_{LOAD}$. Examples of the load 140 will be described later with reference to FIG. 17.

The ADC 142 may generate a digital signal DIG by converting the output signal OUT. As described above with reference to the drawings, the output signal OUT may be an analog signal corresponding to the magnitude of the load current $I_{LOAD}$ and the ADC 142 may provide the digital signal DIG that is a multi-bit signal to the processing circuitry 144 by converting the output signal OUT. Therefore, the digital signal DIG may have a value corresponding to the magnitude of the load current $I_{LOAD}$.

The processing circuitry 144 may receive the digital signal DIG from the ADC 142 and may receive the mode signal MD from the switching converter 120. The processing circuitry 144 may identify the magnitude of the load current $I_{LOAD}$ based on the digital signal DIG and the mode signal MD. For example, the processing circuitry 144 may identify the magnitude of the load current $I_{LOAD}$ corresponding to a value of the digital signal DIG in response to the mode signal MD representing the first mode. In addition, the processing circuitry 144 may identify the magnitude of the load current $I_{LOAD}$ corresponding to a compensated value from the value of the digital signal DIG in response to the mode signal MD representing the second mode. When the pulse PL used for generating the output signal OUT has the width $t_{PL}$ of the [EQUATION 1], the processing circuitry 144 may identify the magnitude of the load current $I_{LOAD}$ corresponding to a value obtained by dividing the value of the digital signal DIG by (1+N) in the second mode. In some example embodiments, in order to facilitate the division operation of the processing circuitry 144, N of the [EQUATION 1] may satisfy the following [EQUATION 2].

$$N=2^k-1 \quad \text{[EQUATION 2]}$$

In [EQUATION 2], k may be an integer greater than 0 and, when N satisfies [EQUATION 2], in the second mode, the processing circuitry 144 may compensate for the value of the digital signal DIG by shifting the digital signal DIG k times.

In some example embodiments, the processing circuitry 144 may estimate the real time power consumption of the load 140 based on the identified magnitude of the load current $I_{LOAD}$. The processing circuitry 144 may directly utilize information on the estimated power consumption and/or may provide the information on the estimated power consumption to other components of the load 140 and/or devices outside the load 140. The processing circuitry 144 may have an arbitrary structure in which the digital signal DIG may be processed. In some example embodiments, the processing circuitry 144 may include programmable components such as a microcontroller and a processor, a reconfigurable component such as a field programmable gate array (FPGA), and/or a component providing a fixed function such as an intellectual property (IP) core.

Figure 11:
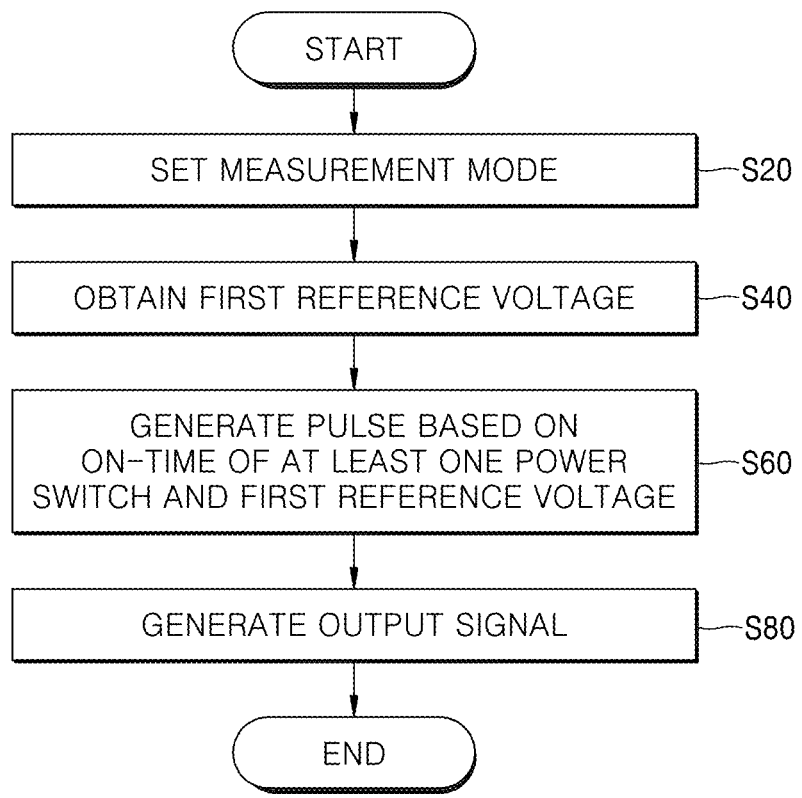
FIG. 11 is a flowchart illustrating a method of measuring a load current according to some example embodiments of inventive concepts.

FIG. 11 is a flowchart illustrating a method of measuring a load current according to some example embodiments of inventive concepts. As illustrated in FIG. 11, the method of measuring a load current may include a plurality of operations S20, S40, S60, and S80. In some example embodiments, the method of FIG. 11 may be performed by the load current meter 30 of FIG. 3 and FIG. 11 will be described hereinafter with reference to FIG. 3.

Referring to FIG. 11, in operation S20, the measurement mode may be set. For example, the pulse generator 32 may identify the magnitude of the load current $I_{LOAD}$ based on the output signal OUT provided by the filter 34. The pulse generator 32 may set the first mode when the load current $I_{LOAD}$ is relatively high and may set the second mode when the load current $I_{LOAD}$ is relatively low. In some example embodiments, the load current meter 30 may be initiated to the second mode for measuring the low load current $I_{LOAD}$. For example, when power is supplied to the load current meter 30 and/or the load current meter 30 receives an activated reset signal, the pulse generator 32 may set the measurement mode as the second mode. An example of operation S20 will be described later with reference to FIG. 12.

In operation S40, the first reference voltage $V_{REF1}$ may be obtained. For example, the load current meter 30 may receive the first reference voltage $V_{REF1}$ from the peak current detector (for example, 16 of FIG. 1) and the peak current detector may use the first reference voltage $V_{REF1}$ for detecting the peak of the inductor current $I_L$. Therefore, the load current meter 30 may obtain information on the peak of the inductor current $I_L$ from the first reference voltage $V_{REF1}$.

In operation S60, the pulse may be generated based on the on-time $t_{ON}$ of at least one power switch and the first reference voltage $V_{REF1}$. For example, the pulse generator 32 may receive the first drive signal DRV1 controlling the first power switch PS1 of FIG. 1 and the second drive signal DRV2 controlling the second power switch PS2 of FIG. 1 and may identify, based on the first drive signal DRV1 and the second drive signal DRV2, the on-time $t_{ON}$ that is a period in which the first power switch PS1 and/or the second power switch PS2 is turned on. In addition, the pulse generator 32 may generate the pulse PL having the amplitude corresponding to the first reference voltage $V_{REF1}$ obtained in operation S40. When the first mode is set in operation S20, the pulse generator 32 may generate the pulse PL having the width corresponding to the on-time $t_{ON}$. On the other hand, when the second mode is set in operation S20, the pulse generator 32 may generate the pulse PL having the width extended in proportion to the on-time $t_{ON}$. An example of operation S60 will be described later with reference to FIG. 13.

In operation S80, the output signal OUT may be generated. For example, the filter 34 may receive the pulse PL from the pulse generator 32 and may generate the output signal OUT by filtering the pulse PL. The pulse PL generated in operation S60 may have an amplitude based on the inductor current $I_L$ and a width based on the on-time $t_{ON}$ of the power switch so that the output signal OUT generated by removing a high frequency component of the pulse PL may have the physical quantity (for example, the voltage) dependent on the magnitude of the load current $I_{LOAD}$.

Figure 12:
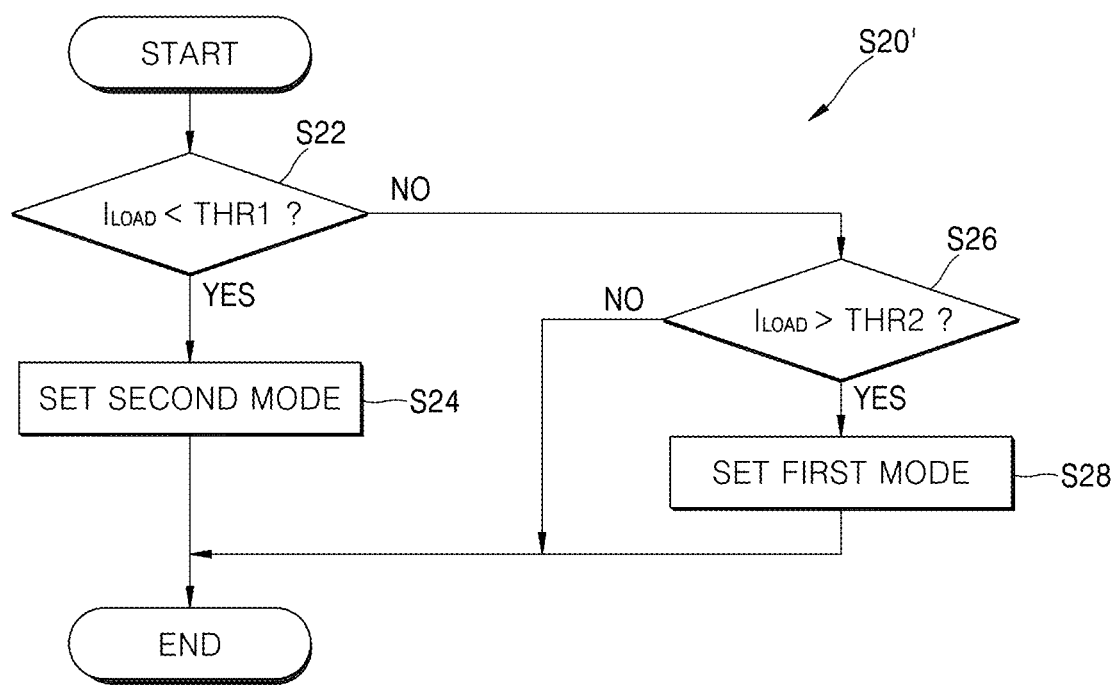
FIG. 12 is a flowchart illustrating a method of measuring a load current according to some example embodiments of inventive concepts.

FIG. 12 is a flowchart illustrating a method of measuring a load current according to some example embodiments of inventive concepts. Specifically, the flowchart of FIG. 12 illustrates an example of operation S20 of FIG. 11. As described above with reference to FIG. 11, in operation S20' of FIG. 12, a measurement mode may be set. As illustrated in FIG. 12, operation S20' may include a plurality of operations S22, S24, S26, and S28. In some example embodiments, operation S20' may be performed by the pulse generator 52 of FIG. 5 and FIG. 12 will be described hereinafter with reference to FIGS. 5 and 6.

Referring to FIG. 12, in operation S22, the value of the load current $I_{LOAD}$ may be compared with the first threshold value THR1. For example, the first threshold value THR1 may be less than the second threshold value THR2 described later and the comparator 52_9 may compare the output signal OUT representing the magnitude of the load current $I_{LOAD}$ with the second reference voltage $V_{REF2}$. In some example embodiments, the reference voltage generator 52_7 may generate the second reference voltage $V_{REF2}$ having a constant level and the first threshold value THR1 and the second threshold value THR2 may be determined by the second reference voltage $V_{REF2}$ and the hysteresis of the comparator 52_9. In some example embodiments, the reference voltage generator 52_7 may receive the output of the comparator 52_9, that is, the mode signal MD, may generate the second reference voltage $V_{REF2}$ at a level corresponding to the first threshold value THR1 in the second mode, and may generate the second reference voltage $V_{REF2}$ at a level corresponding to the second threshold value THR2 in the first mode. As illustrated in FIG. 12, when the value of the load current $I_{LOAD}$ is less than the first threshold value THR1, the second mode may be set in operation S24 and, when the value of the load current $I_{LOAD}$ is equal to or greater than the first threshold value THR1, operation S26 may be subsequently performed.

In operation S26, the value of the load current $I_{LOAD}$ may be compared with the second threshold value THR2. For example, the second threshold value THR2 may be greater than the above-described first threshold value THR1 and the comparator 52_9 may compare the output signal OUT representing the magnitude of the load current $I_{LOAD}$ with the second reference voltage $V_{REF2}$. As illustrated in FIG. 12, when the value of the load current $I_{LOAD}$ is greater than the second threshold value THR2, the first mode may be set in operation S28 and, when the value of the load current $I_{LOAD}$ is equal to or less than the second threshold value THR2, operation S20' may be terminated and the mode set before operation S20' is performed may be maintained. Therefore, hysteresis may be provided to the switch of the measurement mode and frequent switch between the first mode and the second mode may be prevented or reduced in likelihood of occurrence.

Figure 13:
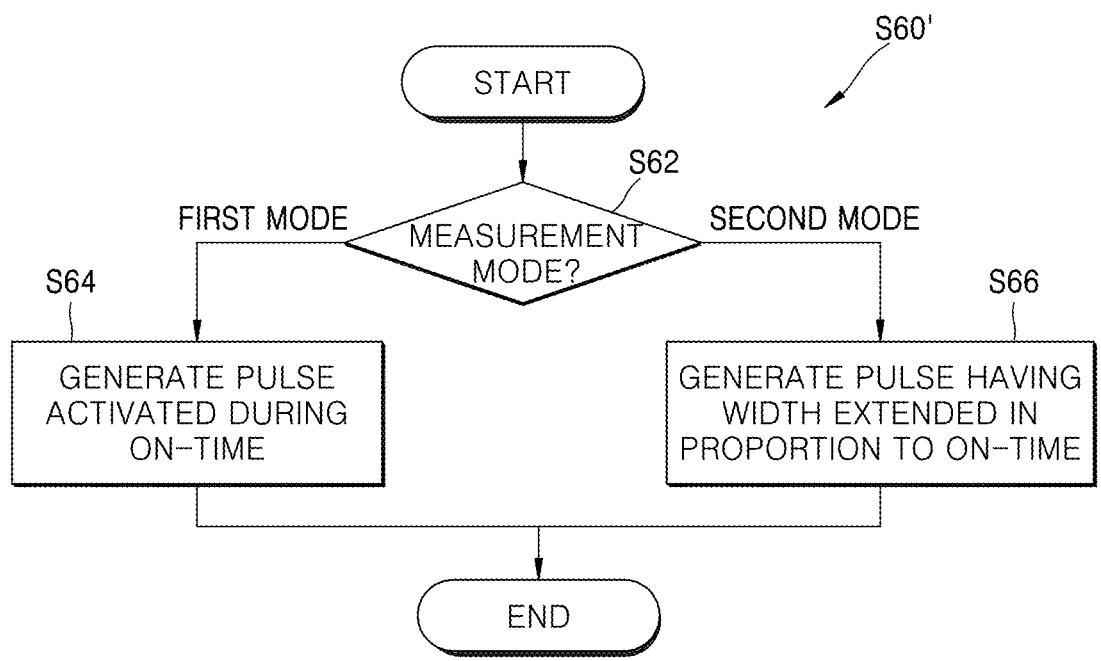
FIG. 13 is a flowchart illustrating a method of measuring a load current according to some example embodiments of inventive concepts.

FIG. 13 is a flowchart illustrating a method of measuring a load current according to some example embodiments of inventive concepts. Specifically, the flowchart of FIG. 13 illustrates an example of operation S60 of FIG. 11. As described above with reference to FIG. 11, in operation S60' of FIG. 13, the pulse may be generated based on the on-time $t_{ON}$ of at least one power switch and the first reference voltage $V_{REF1}$. As illustrated in FIG. 13, operation S60' may include a plurality of operations S62, S64, and S66. In some example embodiments, operation S60' may be performed by the pulse generator 52 of FIG. 5 and FIG. 13 will be described hereinafter with reference to FIG. 5.

Referring to FIG. 13, the measurement mode may be identified in operation S62. For example, the logic circuit 52_3 may identify the first mode in which the high load current $I_{LOAD}$ is measured and/or the second mode in which the low load current $I_{LOAD}$ is measured based on the mode signal MD provided by the comparator 52_9. As illustrated in FIG. 13, when the first mode is identified, operation S64 may be subsequently performed and, when the second mode is identified, operation S66 may be subsequently performed.

In operation S64, the pulse PL activated during the on-time $t_{ON}$ may be generated. For example, in the first mode, the logic circuit 52_3 may generate the first control signal CTR1 based on the first drive signal DRV1 and the second drive signal DRV2 so that pulse PL activated during the identified on-time $t_{ON}$ may be generated by the switch circuit 52_5.

In operation S66, the pulse PL having the width extended in proportion to the on-time $t_{ON}$ may be generated. For example, in the second mode, the logic circuit 52_3 may generate the second control signal CTR2 based on the first drive signal DRV1 and the second drive signal DRV2. The time extension circuit 52_1 may generate, based on the second control signal CTR2, the extension signal EXT deactivated (or activated) in a period proportional to the on-time $t_{ON}$, and the logic circuit 52_3 may generate the first control signal CTR1 based on the extension signal EXT so that the pulse PL having the width extended in proportion to the on-time $t_{ON}$ may be generated by the switch circuit 52_5. An example of operation S66' will be described with reference to FIG. 14.

Figure 14:
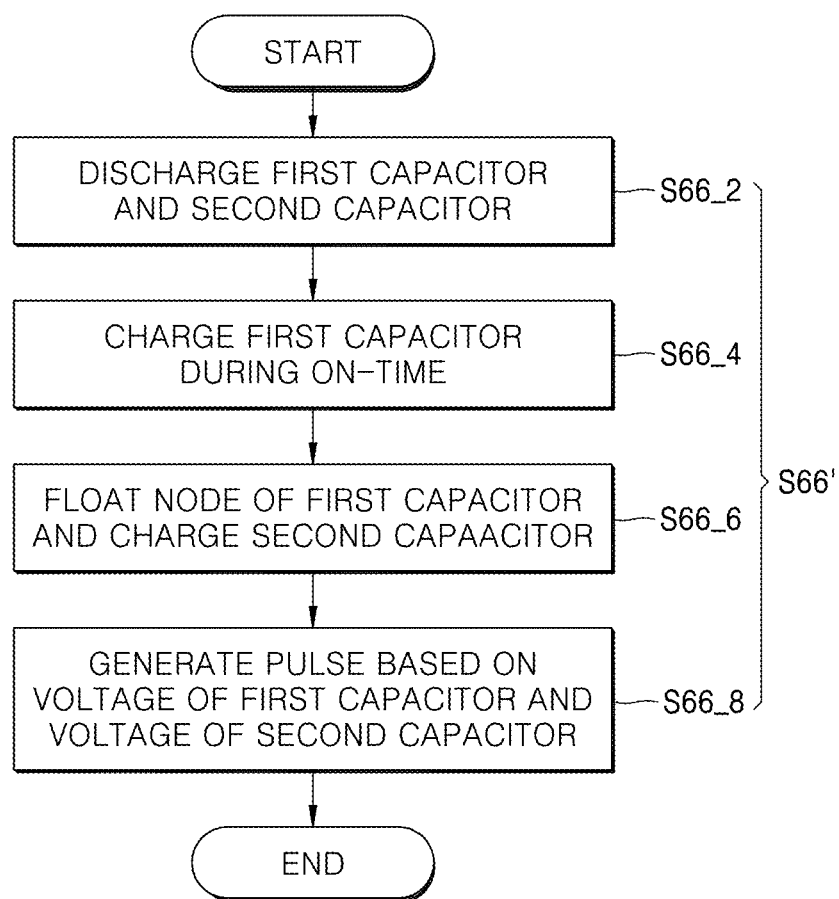
FIG. 14 is a flowchart illustrating a method of measuring a load current according to some example embodiments of inventive concepts.

FIG. 14 is a flowchart illustrating a method of measuring a load current according to some example embodiments of inventive concepts. Specifically, the flowchart of FIG. 14 illustrates an example of operation S66 of FIG. 13. As described above with reference to FIG. 13, in operation S66' of FIG. 14, the pulse PL having the width extended in proportion to the on-time $t_{ON}$ may be generated. As illustrated in FIG. 14, operation S66' may include a plurality of operations S66_2, S66_4, S66_6, and S66_8. In some example embodiments, operation S66' may be performed by the pulse generator 52 of FIG. 5. Hereinafter, FIG. 14 will be described with reference to FIGS. 5 and 8 and it is assumed that the pulse generator 52 of FIG. 5 includes the time extension circuit 80 of FIG. 8.

Referring to FIG. 14, in operation S66_2, the first capacitor C1 and the second capacitor C2 may be discharged. For example, the third switch SW73 and the fourth switch SW74 may be turned on in response to the second control signal CTR2 provided by the logic circuit 52_3 so that the first capacitor C1 and the second capacitor C2 may be discharged.

In operation S66_4, the first capacitor C1 may be charged during the on-time $t_{ON}$. For example, the first switch SW71 may be turned on and the third switch SW73 may be turned off in response to the second control signal CTR2 during the on-time $t_{ON}$. Therefore, the first capacitor C1 may be charged by the constant current $I_{CON}$ provided by the current source 82, and the first voltage V1 may increase.

In operation S66_6, a node of the first capacitor C1 may be floated and the second capacitor C2 may be charged. For example, the first switch SW71 may be turned off and the second switch SW72 may be turned on in response to the second control signal CTR2 after the on-time $t_{ON}$. Therefore, the node in which the constant current $I_{CON}$ is applied to the first capacitor C1, for example the first node N1, may be floated and the first voltage V1 may be substantially maintained. In addition, the second capacitor C2 may be charged by the constant current $I_{CON}$ provided by the current source 82 and the second voltage V2 may increase. Due to the capacitance of the second capacitor C2 being greater than the capacitance of the first capacitor C1, a speed at which the second voltage V2 increases in operation S66_6 may be lower than a speed at which the first voltage V1 increases in operation S66_4 and a ratio between the two speeds may be based on a ratio between the capacitance of the first capacitor C1 and the capacitance of the second capacitor C2.

In operation S66_8, based on the voltage of the first capacitor C1 and the voltage of the second capacitor C2, the pulse PL may be generated. For example, when the on-time $t_{ON}$ start in operation S66_4, that is, when the first voltage V1 starts to increase, the pulse PL may be activated. In addition, when the second voltage V2 increasing in operation S66_6 reaches the first voltage V1, the pulse PL may be deactivated. Therefore, the pulse PL may have the width increased/extended exactly or more exactly in proportion to the on-time $t_{ON}$.

Figure 15:
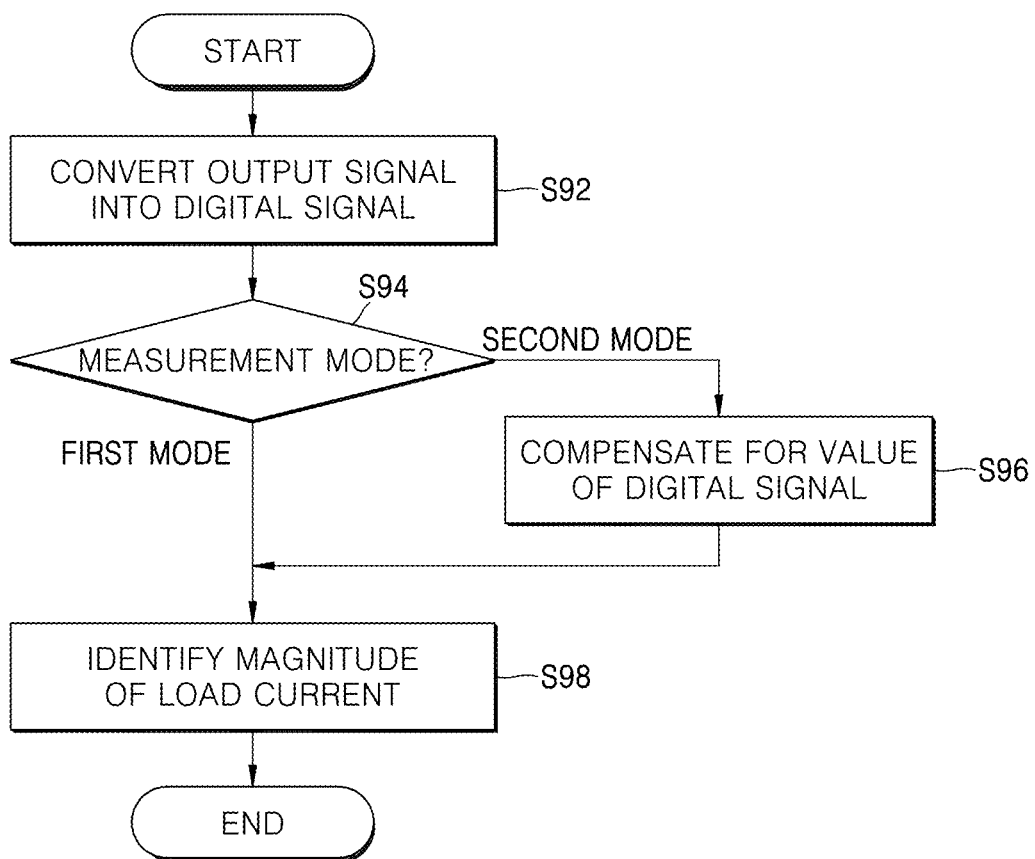
FIG. 15 is a flowchart illustrating a method of measuring a load current according to some example embodiments of inventive concepts.

FIG. 15 is a flowchart illustrating a method of measuring a load current according to some example embodiments of inventive concepts. Specifically, the flowchart of FIG. 15 illustrates the method of detecting the magnitude of the load current $I_{LOAD}$ based on the output signal OUT. In some example embodiments, operation S90 of FIG. 15 may be performed subsequent to operation S80 of FIG. 11. As illustrated in FIG. 15, operation S90 may include a plurality of operations S92, S94, S96, and S98. In some example embodiments, operation S90 may be performed by the load 140 of FIG. 10 and FIG. 15 will be described hereinafter with reference to FIG. 10.

Referring to FIG. 15, in operation S92, the output signal OUT may be converted into the digital signal DIG. For example, the output signal OUT may be an analog signal having a physical quantity (for example, the voltage) proportional to the magnitude of the load current $I_{LOAD}$ and the ADC 142 may generate the digital signal DIG by converting the output signal OUT.

In operation S94, the measurement mode may be identified. For example, the processing circuitry 144 may receive the mode signal MD from the switching converter 120 and may identify the measurement mode of the load current $I_{LOAD}$ based on the mode signal MD. As illustrated in FIG. 15, when the first mode is identified, operation S98 may be subsequently performed and, when the second mode is identified, operation S96 may be subsequently performed.

In operation S96, a value of the digital signal DIG may be compensated for. For example, in the second mode, the processing circuitry 144 may divide the value of the digital signal DIG by a specific (or, alternatively, predetermined) divisor. The divisor may correspond to a ratio in which the width of the pulse PL is extended in the switching converter 120. The divisor may be previously stored in the processing circuitry 144 and/or may be provided by the switching converter 120.

In operation S98, the magnitude of the load current $I_{LOAD}$ may be identified. For example, in the first mode, the processing circuitry 144 may identify the magnitude of the load current $I_{LOAD}$ corresponding to the value of the digital signal DIG generated in operation S92. In addition, in the second mode, the processing circuitry 144 may identify the magnitude of the load current $I_{LOAD}$ corresponding to the value obtained by compensating for the value of the digital signal DIG in operation S96.

Figure 16:
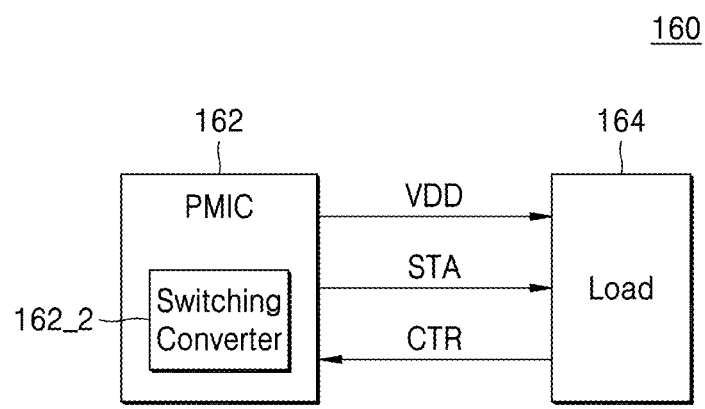
FIG. 16 is a block diagram illustrating a system according to some example embodiments of inventive concepts.

FIG. 16 is a block diagram illustrating a system 160 according to some example embodiments of inventive concepts. As illustrated in FIG. 16, the system 160 may include a power management integrated circuit (PMIC) 162 and a load 164.

The system 160 may provide an arbitrary function by the load 164 consuming power and performing an operation for the function. For example, the system 160 may be or may include a computing system such as at least one of a personal computer (PC), a server, a mobile phone, and/or a wearable device, a transportation unit such as a vehicle, a ship, and/or an electric kickboard, and/or a subsystem included in one of the above-described systems.

The PMIC 162 may include a switching converter 162_2 described above with reference to the drawings and may provide a positive supply voltage VDD generated by the switching converter 162_2 to the load 164. In addition, the PMIC 162 may provide a state signal STA including information on power consumption of the load 164 to the load 164. For example, the switching converter 162_2 may generate the output signal OUT corresponding to the magnitude of the load current $I_{LOAD}$ provided to the load 164 as described above with reference to the drawings and the PMIC 162 may provide the output signal OUT and/or the state signal STA including information on the magnitude of the load current $I_{LOAD}$ detected based on the output signal OUT to the load 164.

The load 164 may receive the positive supply voltage VDD from the PMIC 162 and may operate based on the positive supply voltage VDD. In addition, the load 164 may receive the state signal STA from the PMIC 162 and may estimate and/or identify the power consumption of the load 164 based on the state signal STA. As described above with reference to the drawings, due to the exactly or more accurately measured load current $I_{LOAD}$, the load 164 may estimate and/or identify correct power consumption. The load 164 may control the PMIC 162 through a control signal CTR. For example, the load 164 may provide a magnitude of the positive supply voltage VDD and entry and/or exit to and/or from the power saving mode to the PMIC 162 through the control signal CTR. The PMIC 162 may control the magnitude of the positive supply voltage VDD based on the control signal CTR and/or may stop and/or resume generation of the positive supply voltage VDD.

Figure 17:
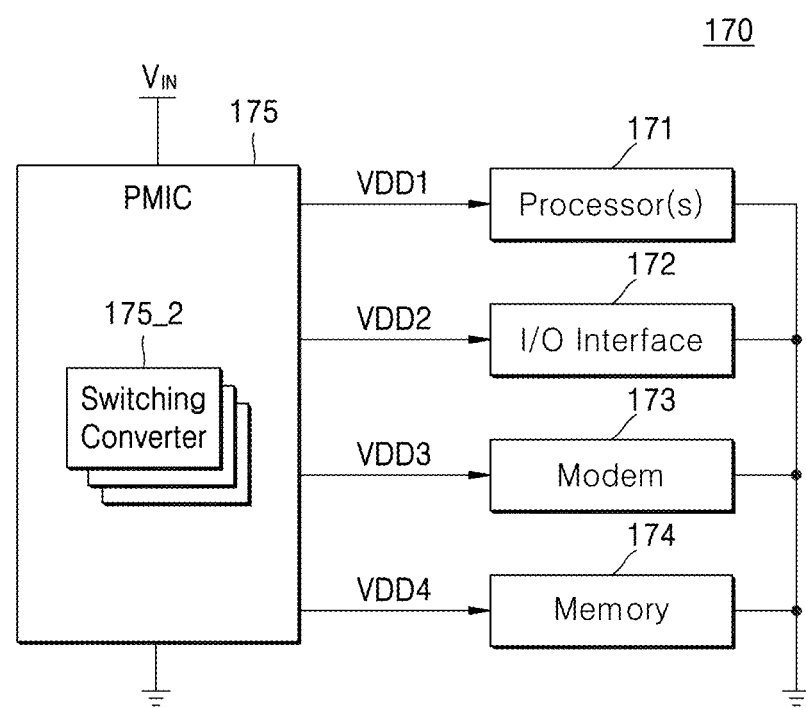
FIG. 17 is a block diagram illustrating a system according to some example embodiments of inventive concepts.

FIG. 17 is a block diagram illustrating a system 170 according to some example embodiments of inventive concepts. In some example embodiments, the system 170 may be an integrated circuit included in one semiconductor package such as a system-on-chip (SoC). In some example embodiments, the system 170 may include a PCB and semiconductor packages mounted on the PCB. As illustrated in FIG. 17, the system 170 may include at least one processor 171, an input and output interface 172, a modem 173, memory 174, and a PMIC 175.

The at least one processor 171, the input and output interface 172, the modem 173, and the memory 174 may operate based on power provided by first to fourth positive supply voltages VDD1 to VDD4 provided by the PMIC 175. For example, the at least one processor 171 may execute a series of instructions and/or may process a signal based on the first positive supply voltage VDD1. The input and output interface 172 may process an input received from the outside of the system 170 and may generate an output provided to the outside of the system 170 based on the second positive supply voltage VDD2. The modem 173 may process a signal received through a communication channel and/or may generate a signal to be transmitted through the communication channel based on the third positive supply voltage VDD3. The memory 174 may store data based on the fourth supply voltage VDD4 and may include a volatile memory device such as dynamic random access memory (DRAM) and/or a static RAM (SRAM) and/or a non-volatile memory device such as flash memory and/or a resistive RAM (RRAM).

The PMIC 175 may include a plurality of switching converters 175_2 and each of the plurality of switching converters 175_2 may generate one of the first to fourth positive supply voltages VDD1 to VDD4 from the input voltage $V_{IN}$. As described above with reference to the drawings, each of the plurality of switching converters 175_2 may more precisely, e.g. may exactly measure a load current provided thereby in spite of a wide change range.

Any of the elements disclosed above may include and/or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

None of the above-described example embodiments are necessarily mutually exclusive to one another. For example, some example embodiments may include features described with reference to one or more figures, and also may include features described with reference to other figures. Example embodiments are not limited thereto.

While inventive concepts has been particularly shown and described with reference to embodiments thereof, it will be understood that various changes in form and details may be made therein without departing from the spirit and scope of the following claims.

What is claimed is:

1. An apparatus for measuring a load current provided to a load of a switching converter, the apparatus comprising:
   time extension circuitry configured to generate an extension signal that is activated during a time proportional to an on-time of at least one power switch of the switching converter;
   logic circuitry configured to generate a first control signal based on the on-time in response to a mode signal indicating a first mode, and the logic circuitry configured to generate the first control signal based on the extension signal in response to the mode signal indicating a second mode;
   switch circuitry configured to receive a first reference voltage defining a peak of an inductor current passing through an inductor of the switching converter and to generate a pulse based on the first control signal;
   a filter configured to generate an output signal by filtering the pulse; and
   a first comparator configured to generate the mode signal based on a voltage of the output signal and a second reference voltage,
   wherein the logic circuitry is configured to be in the second mode based on the mode signal in response to a value of the load current being less than a first threshold value.

2. The apparatus of claim 1, wherein the time extension circuitry comprises:
   a current source configured to generate a constant current;
   a second comparator configured to output the extension signal;
   a first capacitor connected to the second comparator and a second capacitor connected to the second comparator; and
   a plurality of switches configured to receive a second control signal,
   wherein the logic circuitry is configured to generate the second control signal to charge the first capacitor by the constant current during the on-time and to charge the second capacitor by the constant current after the on-time in the second mode.

3. The apparatus of claim 2, wherein the logic circuitry is configured to generate the second control signal in the second mode so that a node to which the first capacitor and the second comparator are connected floats while the second capacitor charges based on the constant current.

4. The apparatus of claim 2, wherein the second comparator is configured to generate the extension signal that is activated in response to a voltage of the second capacitor being higher than a voltage of the first capacitor, and
   wherein the logic circuitry is configured to generate the first control signal in the second mode so that the pulse is active from a first point in time at which the on-time initiates to a second point in time at which the extension signal is deactivated.

5. The apparatus of claim 2, wherein the plurality of switches comprise:
   a first switch connected to the first capacitor in parallel; and
   a second switch connected to the second capacitor in parallel,
   wherein the logic circuitry is configured to generate the second control signal in the second mode so that the first switch and the second switch turn on before the on-time.

6. The apparatus of claim 2, wherein a capacitance of the second capacitor is greater than a capacitance of the first capacitor.

7. The apparatus of claim 1, wherein the logic circuitry is configured to be in the first mode based on the mode signal in response to the value of the load current being greater than a second threshold value, and
   the second threshold value is greater than the first threshold value.

8. The apparatus of claim 1, wherein the apparatus is configured to output the mode signal to the outside.

* * * * *